Sept. 20, 1932.    L. W. THOMPSON    1,878,350
ELECTRICAL REGULATING MEANS
Filed April 29, 1930

Inventor:
Louis W. Thompson,
by Charles E. Mullan
His Attorney.

Patented Sept. 20, 1932

1,878,350

UNITED STATES PATENT OFFICE

LOUIS W. THOMPSON, OF SCHENECTADY, NEW YORK, ASSIGNOR TO GENERAL ELECTRIC COMPANY, A CORPORATION OF NEW YORK

ELECTRICAL REGULATING MEANS

Application filed April 29, 1930. Serial No. 448,396.

My invention relates to electrical regulating means and more particularly to means for regulating the voltage of alternating current load circuits or machines.

Considerations of reliability and sensitivity of operation makes desirable the use of regulators of the above mentioned class which have no moving parts. Regulators of this type may be referred to as of the static type.

An object of my invention is to provide a new and improved electrical regulator of the static type for use in connection with variable load alternating current circuits or machines.

Another object of my invention is to provide new and improved means for regulating the voltage of variable load alternating current distribution circuits.

An additional object of my invention is to provide a novel form of saturable reactor for use in connection with static electrical circuit regulators which involve the principle of magnetic saturation.

My invention will be better understood from the following description taken in connection with the accompanying drawing and its scope will be pointed out in the appended claims.

Figure 1:
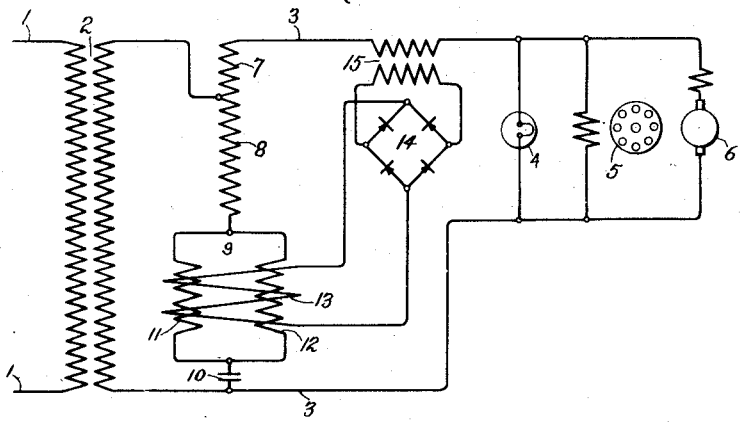
Figure 2:
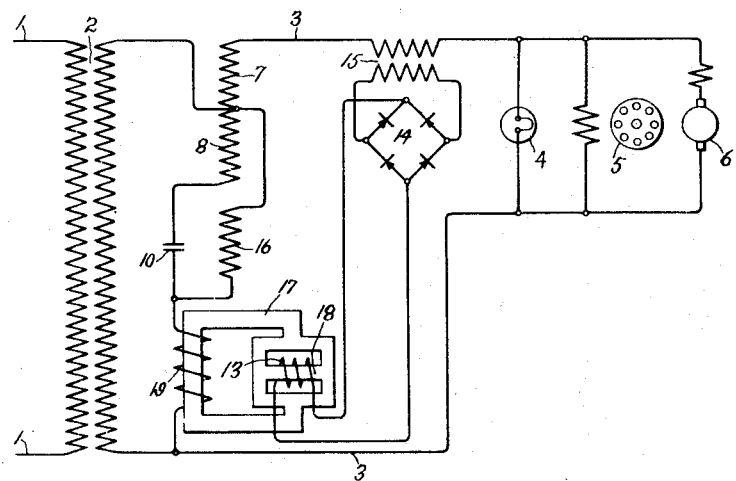

In the drawing, Fig. 1 is a diagrammatic representation of a specific embodiment of my invention, while Fig. 2 is an illustration of a modification thereof.

Referring now to Fig. 1 wherein I have shown by way of illustration my invention as applied to the regulation of a low voltage alternating current distribution or feeder circuit, such as a circuit which supplies the ordinary private house with electrical energy and in which 1 is an alternating current power supply circuit, which is connected to the relatively low voltage feeder circuit 3 by means of a distribution transformer 2. Connected to circuit 3 are a plurality of load devices such as an incandescent lamp 4, an induction motor 5, and an alternating current series commutator motor 6, which collectively may be take to represent a typical feeder circuit load. For providing the necessary voltage boost to feeder circuit 3 in order to compensate for the voltage drops in lines 1, 3 and transformer 2 when the magnitude in the load on circuit 3 varies I have shown transforming means in the form of an auto transformer, which in the particular use to which I put it is more often referred to as a booster transformer, comprising a series winding 7 connected in circuit 3 and a shunt winding 8 connected across circuit 3.

For varying the voltage across shunt winding 8 with variations in load on circuit 3, in order to provide the necessary compensatory voltage boost, I provide a saturable reactor 9 and a capacitive reactance 10 connected in series with shunt winding 8. Reactor 9 may be of any type such as a simple iron core reactor having a saturating winding wound thereon, but I prefer to use a reactor of the type shown having a pair of alternating current coils 11 and 12, which are both linked by a direct current saturating winding 13. Coils 11 and 12 are so connected that their individual instantaneous magneto-motive forces around the magnetic circuit of the reactor are additive, while at the same time the individual instantaneous voltages induced in the direct current saturating winding 13 are in opposition, and thus cancel each other. This may be readily achieved by winding coils 11 and 12 in opposite directions with respect to saturating winding 13. Such a construction not only prevents an unbalanced alternating current voltage being induced in the direct current saturating winding, but it also prevents the production of even harmonics by the reactor. It is, of course, to be understood that in actual practice reactor 9 is provided with a suitable core. For varying the current through coil 13 and hence its saturating effect on the reactor with variations in load on circuit 3 I provide means such as a full wave copper oxide rectifier 14 having direct current terminals connected to coil 13 and alternating current terminals connected to a current transformer 15 whose primary winding is connected in circuit 3.

The modification shown in Fig. 2 differs from the embodiment of my invention shown in Fig. 1 in that the booster transformer is provided with an additional shunt winding 16 which is connected in series with the reactor but not in series with the condenser 10. By this construction I secure an improved regulating characteristic of my regulator. Another difference between the embodiments shown in Figs. 1 and 2 is in the novel form of saturable reactor shown in the latter. This reactor comprises a core 17 having a split section in which is a transverse portion 18 having wound thereon a direct current saturating winding 13. With this construction but a single alternating current coil 19 need be wound on the main part of the core. As the alternating flux does not pass through member 18 no alternating voltage is induced in the direct current saturating coil 13, while as the alternating flux traverses a magnetic circuit in which the magnetic bias produced by the saturating coil is composed of equal and opposite components in different parts of the circuit, the two halves of the alternating flux wave will not be unequally distorted and hence the reactor will not give rise to even harmonics.

The operation of the embodiment of my invention shown in Fig. 1 is as follows. Assume that power supply circuit 1 is connected to a suitable source of current (not shown) and that the load on circuit 3 has just been increased. This increase in load would normally result in a decrease in voltage at the terminals of the load devices, but through the action of my regulator a voltage boost is induced in series winding 7 which compensates for such a drop. The production of this boost is secured by increasing the fraction of the total voltage of circuit 3 which is represented by the voltage drop across shunt winding 8. Thus, as the load increases the following action takes place. The increase in current through series winding 7 must also result in an increase in current through the shunt circuit comprising the shunt winding 8, saturable reactor 9, and condenser 10, because of the fact that windings 7 and 8 are parts of an auto transformer on the same core and hence the ampere turns of the primary and secondary windings must be approximately equal at all times. Thus, as the current in this shunt circuit increases the voltage drop across condenser 10 increases in a straight line relation, and at the same the voltage drop across reactor 9 increases but at a lesser rate than the increase in voltage drop in condenser 10 because the increase in alternating current through the reactor causes its core to be worked at a higher point on its magnetization curve thus reducing its reactance and also because the increase in direct current through saturating winding 13 by the action of transformer 15 and rectifier 14 results in an additional factor tending to produce saturation of the core. The advantage of the controllable saturating means, comprising coil 13, rectifier 14, and transformer 15, is that it results in an improved regulation at light loads because through its action the knee of the magnetization curve of the core is passed sooner. A curve representing the variations in voltage across the reactor with variations in load current would resemble the magnetization curve of its core. Now, as the voltage drops across reactor 9 and condenser 10 are vectorially substantially 180° apart their vector sum is substantially their arithmetic difference and it will be apparent from the foregoing that this difference decreases with an increase in load on circuit 3 for as the reactor voltage increases at a lessening rate due to saturation a point will be reached when the reactor voltage is numerically equal to the capacitor voltage. Therefore, as the total voltage drop across the reactor and the condenser decreases with an increase in load the voltage drop across shunt winding 8 increases thereby to increase the voltage boost in series winding 7. Likewise, a decrease in load on circuit 3 will result in an increase in the proportion of the total voltage of circuit 3 represented by reactor 9 and condenser 10 with the result that the voltage across shunt winding 8 will decrease thereby to decrease the voltage boost in circuit winding 7.

In Fig. 2 the additional shunt winding 16 also acts to produce a voltage boost in series winding 7 upon an increase in load on circuit 3, but the characteristic of this voltage boost with changes in load on circuit 3 will be different from the similar characteristic produced by shunt winding 8. Thus, as the load on circuit 3 increases the ratio of the reactance of winding 16 to the reactance of the saturable reactor decreases, due to the saturation of the reactor, to thus increase the voltage across winding 16 and hence the voltage boost induced in winding 7. Likewise, a decrease in load on circuit 3 results in a decrease in voltage across shunt winding 16. It will thus be seen that the total voltage boost of series winding 7 will have two components, the first being produced by the effect of the combination of the saturable reactor and condenser 10 on shunt winding 8, and the second being produced by the effect of the saturable reactor alone on shunt winding 16. Through this arrangement it is possible to secure an improved regulation of circuit 3 by the regulator as a whole. The means for producing the above mentioned second component of voltage boost is disclosed and claimed per se in my application, filed April 29, 1930, Serial No. 448,394, electrical regulating means, which application is assigned to the assignee of the present application.

While I have shown and described particular embodiments of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. The combination of a circuit, regulating means including means for controlling an electrical condition of said circuit, and means including a saturable reactor and a capacitance for controlling an electrical condition of said circuit controlling means, the resultant voltage drop across said reactor and capacitance varying inversely with the current in said circuit due to the increasing magnetic saturation of said reactor, and means operative in accordance with the current in said circuit for saturating said reactor at a value of current in said circuit which is less than the value of current in said circuit at which said reactor inherently saturates.

2. In combination, an alternating current circuit, regulating means including a transformer for providing a voltage boost in said circuit, a saturable reactor and a condenser connected in series with the primary winding of said transformer, and means for varying the saturation of said reactor in accordance with variations in an electrical condition of said circuit.

3. In combination, an alternating current circuit, a booster transformer including a series winding connected in said circuit and a shunt winding connected across said circuit, a saturable reactor and a capacitor connected in series with said shunt winding, and means for varying the saturation of said reactor in proportion to variation in the current of said circuit.

4. In combination, an alternating current circuit, an auto transformer having a shunt winding and a series winding connected to said circuit, an inductive reactance and a capacitive reactance connected in series with the shunt winding of said transformer, and means including a rectifier for varying the magnetic saturation of said inductive reactance in accordance with variations in current of said circuit.

5. In combination, an alternating current circuit, a booster transformer connected to said circuit, said transformer including a series winding and a pair of parallel connected shunt windings, an inductive reactance connected in series with said shunt windings, a capacitive reactance connected in the circuit of one of said shunt windings, and means for varying the magnetic saturation of said inductive reactance in accordance with variations of an electrical condition of said circuit.

6. In combination, an alternating current circuit, a booster transformer including a series voltage boosting winding and a pair of parallel connected shunt windings, a saturable reactor connected in series with said shunt windings, a capacitive reactance connected in the circuit of one of said shunt windings, a saturating winding on said saturable reactor, and means including a full wave rectifier connecting said saturating winding in said circuit.

7. In a system of distribution, in combination, an alternating current power supply circuit, an alternating current load circuit, a step-down transformer connecting said circuits, a booster transformer including a series winding and a shunt winding connected to said circuit, a saturable reactor including a direct current saturating winding and a pair of alternating current coils associated therewith, said coils being connected in series with said shunt winding in such a manner that they induce no net instantaneous voltage in the saturating windings, although their instantaneous magneto-motive forces are additive around the magnetic circuit of said reactor, a capacitive reactance connected in the circuit of said shunt winding, a full wave rectifier having alternating current terminals and direct current terminals, means connecting said direct current terminals to said saturating winding, and means connecting said alternating current terminals in said load circuit.

8. In a system of distribution, in combination, an alternating current power supply circuit, an alternating current load circuit, a step-down transformer connecting said circuits, a booster transformer including a series winding and a pair of shunt windings connected to said circuit, a saturable reactor including a direct current saturating winding and a pair of alternating current coils associated therewith, said coils being connected in parallel with each other in series with said parallel connected shunt windings in such a manner that they induce no net instantaneous voltage in said saturating winding although their individual instantaneous magneto-motive forces are additive around the magnetic circuit of said reactor, a capacitive reactance connected in series with one of said shunt windings, a full wave rectifier having alternating current terminals and direct current terminals, means connecting said direct current terminals to said saturating winding, and means including a current transformer connecting said alternating current terminals in said load circuit.

In witness whereof, I have hereunto set my hand this 24th day of April, 1930.

LOUIS W. THOMPSON.